United States Patent
van Rotterdam et al.

(10) Patent No.: US 10,152,522 B1
(45) Date of Patent: Dec. 11, 2018

(54) GLOBALLY DISTRIBUTED COMPLIANCE ENFORCEMENT

(71) Applicant: EMC Corporation, Hopkinton, MA (US)

(72) Inventors: Jeroen Mattijs van Rotterdam, Berkeley, CA (US); David Humby, Ontario (CA); Una T. Kearns, Dublin (IE); Raman Meenakshisundaram, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 268 days.

(21) Appl. No.: 14/871,485

(22) Filed: Sep. 30, 2015

(51) Int. Cl.
*H04L 29/06* (2006.01)
*G06F 17/30* (2006.01)
*H04L 29/08* (2006.01)

(52) U.S. Cl.
CPC ...... *G06F 17/30554* (2013.01); *H04L 63/102* (2013.01); *H04L 67/18* (2013.01)

(58) Field of Classification Search
CPC .............. G06F 21/6227; G06F 21/602; G06F 2221/2107; H04L 9/083; H04L 9/0891; H04L 63/0428; H04L 2209/04; H04L 2463/041
See application file for complete search history.

(56) References Cited

U.S. PATENT DOCUMENTS

| | | | | |
|---|---|---|---|---|
| 9,501,453 | B2* | 11/2016 | Gasn | G06F 17/30893 |
| 2009/0177301 | A1* | 7/2009 | Hayes | G11B 19/025 |
| | | | | 700/94 |
| 2011/0093471 | A1* | 4/2011 | Brockway | G06F 17/30616 |
| | | | | 707/747 |
| 2011/0145580 | A1* | 6/2011 | Auradkar | H04L 63/0428 |
| | | | | 713/170 |
| 2014/0181889 | A1* | 6/2014 | Black | G06F 21/55 |
| | | | | 726/1 |
| 2016/0140349 | A1* | 5/2016 | Brown | G06F 21/602 |
| | | | | 713/189 |

* cited by examiner

*Primary Examiner* — Tri M Tran
(74) *Attorney, Agent, or Firm* — Chamberlain, Hrdlicka, White, Williams & Aughtry

(57) ABSTRACT

A method and system for requesting a first data, including receiving from a first requestor a first query request to read the first data located in a first geographic location, where the first requestor is located in a second geographic location. The method further includes executing the first query request by a query engine in the first geographic location to obtain a first query result, obtaining a first compliance rule based on at least one of the first geographic location, the second geographic location, generating an exportable result by applying the first compliance rule to the first query result, and transmitting the first exportable result to the first requestor.

20 Claims, 11 Drawing Sheets

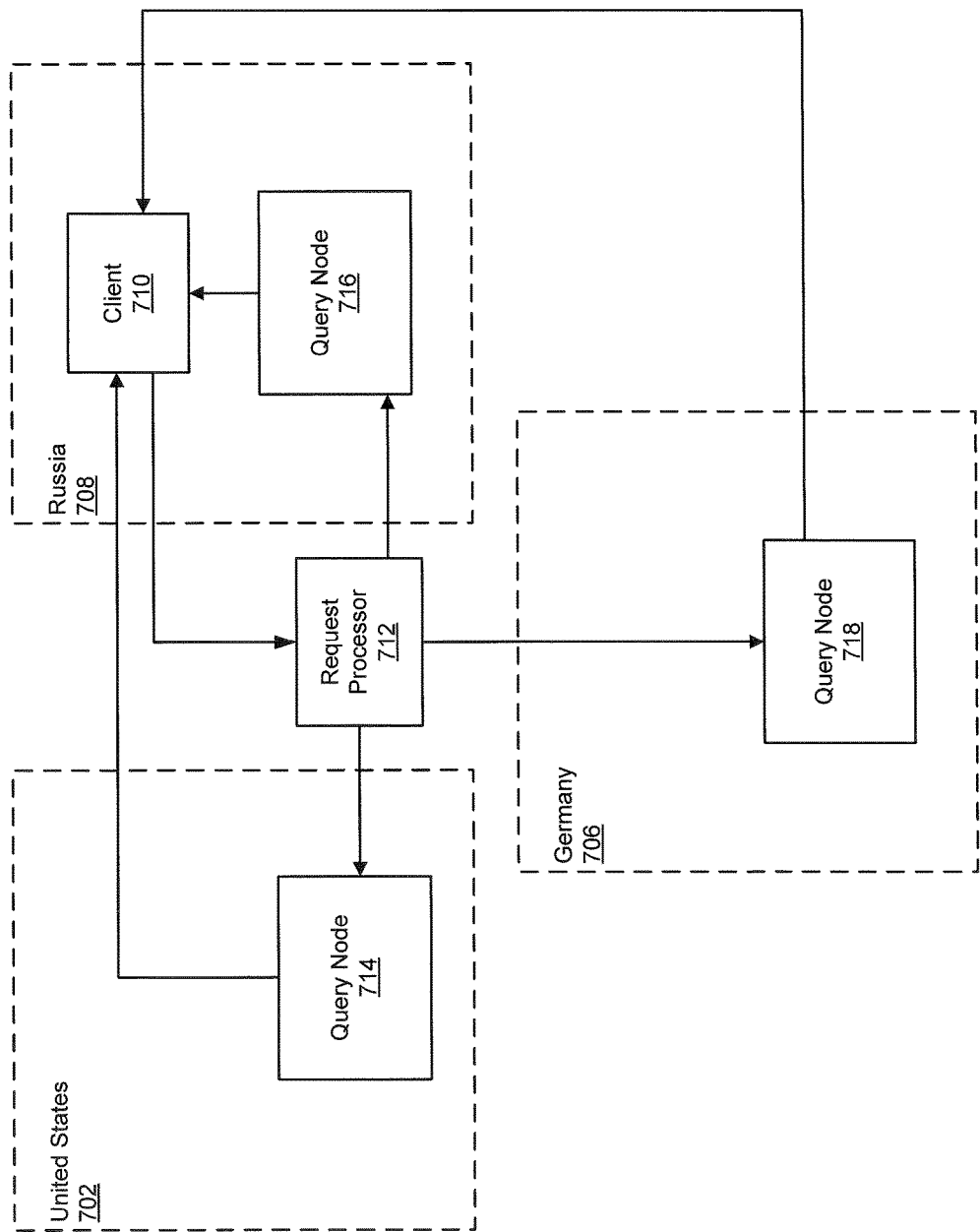

GLOBALLY DISTRIBUTED COMPLIANCE ENFORCEMENT

BACKGROUND

Significant amounts of data (e.g., documents, records, images, audio-visual content) are stored on computing systems. It is often the case that this data includes confidential information (e.g., information that is to be kept private or only distributed under certain circumstances to certain individuals). Traditional approaches for ensuring that access to confidential information are limited to appropriate individuals do not contemplate globally distributed data.

BRIEF DESCRIPTION OF DRAWINGS

FIG. 7A shows an example in accordance with one or more embodiments of the technology.

DETAILED DESCRIPTION

Figure 1:
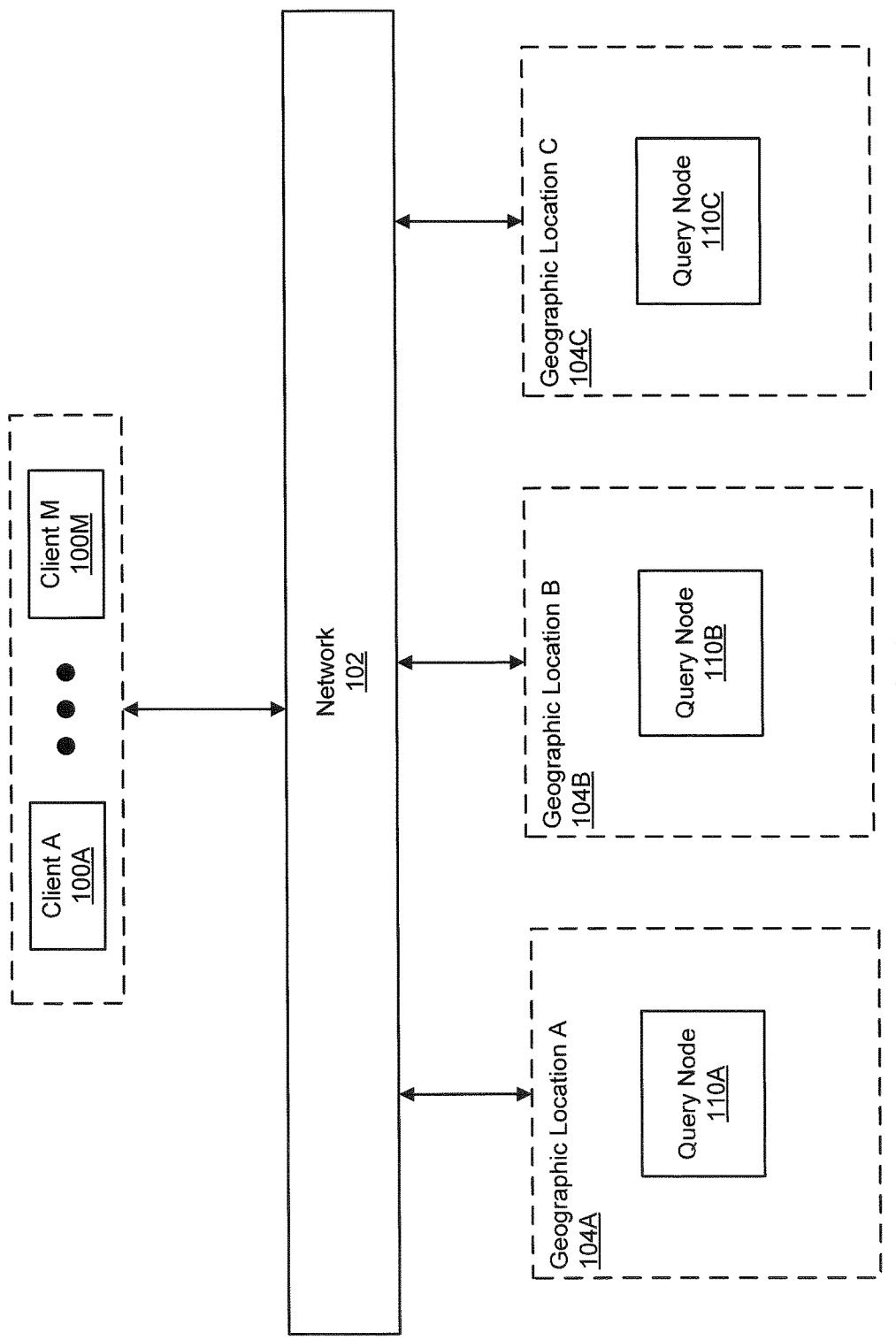
FIG. 1 shows an example system in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology relate to enforcement of compliance requirements for distributed data archives. More specifically, embodiments of the technology relate to accessing globally distributed data archives using query nodes where the query nodes implement compliance rules. For example, certain information may need to be stored within a particular geographic boundary and/or local laws may not permit certain information to be transmitted outside geographic boundaries. Accordingly, the query nodes implement compliance rules to ensure that the data is handled in a manner that does not violate, for example, any local laws.

FIG. 1 shows an example system in accordance with one or more embodiments of the technology. As shown in FIG. 1, the system includes one or more clients (100A-100M), a network (102), and one or more query nodes (110A-C) in different geographic locations (104A-C). Each of these components is described below.

Figure 3:
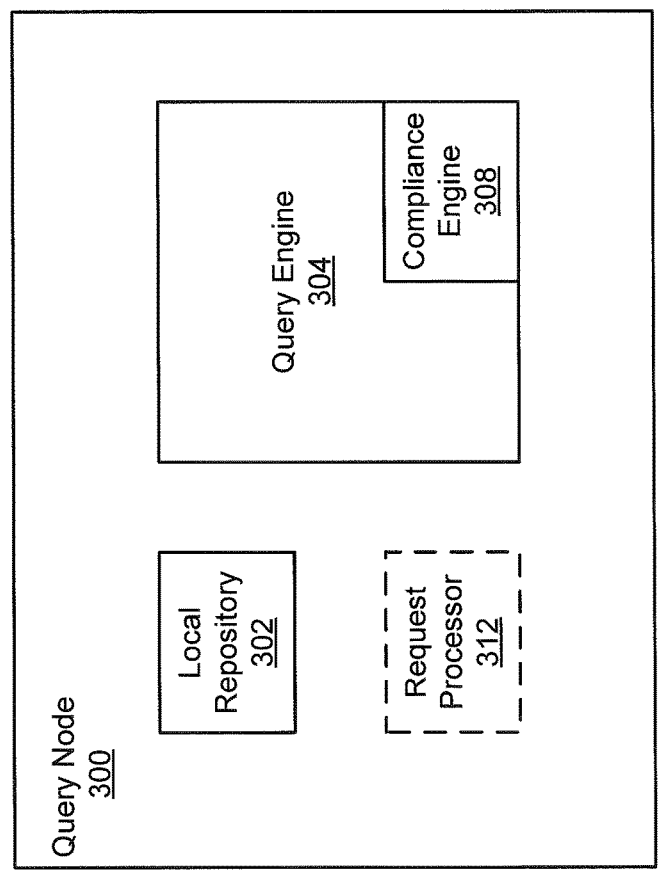
FIG. 3 shows an example of a query node in accordance with one or more embodiments of the technology.
Figure 4:
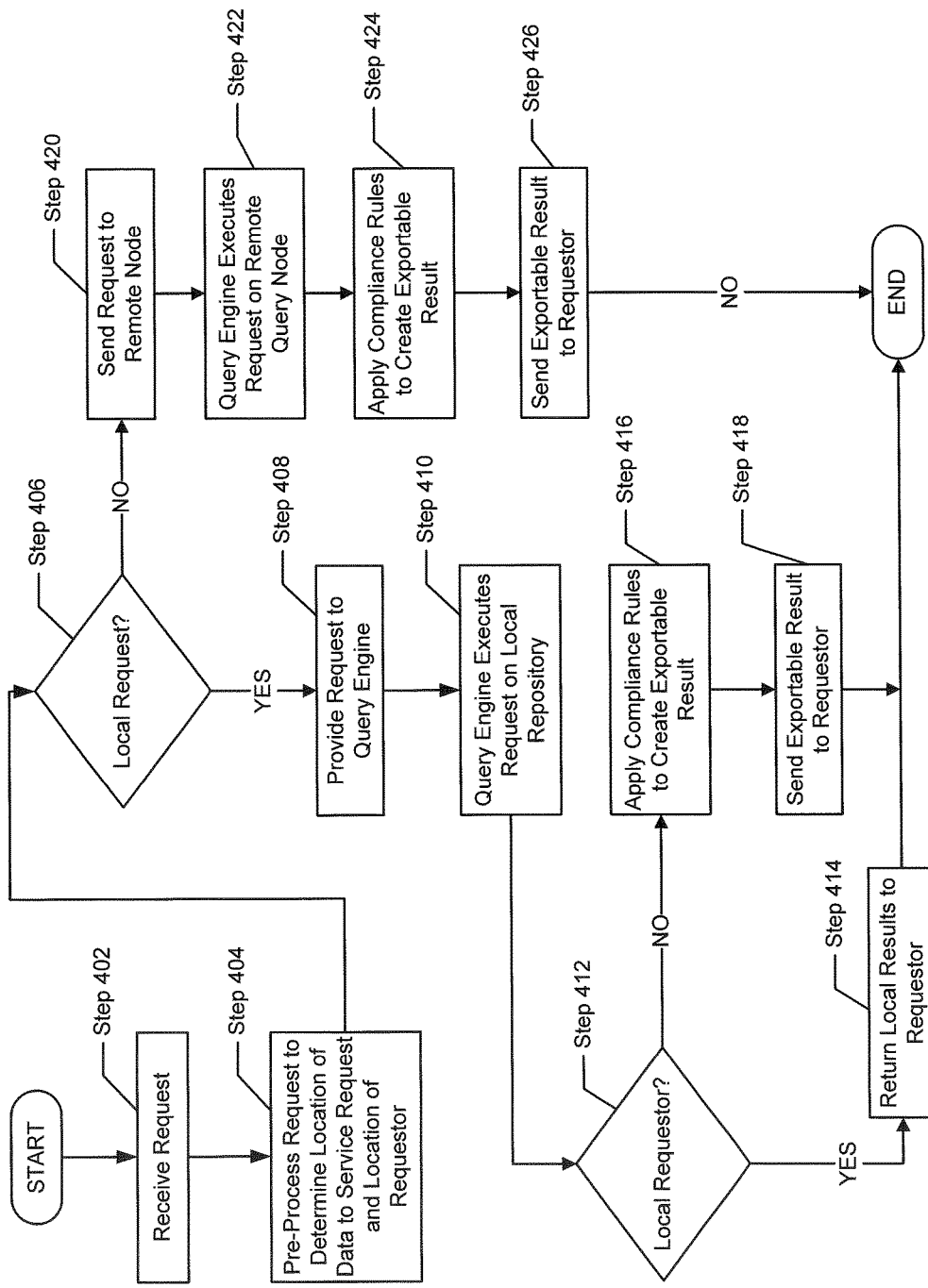
FIG. 4 shows an example method for requesting data in accordance with one or more embodiments of the technology.
Figure 6:
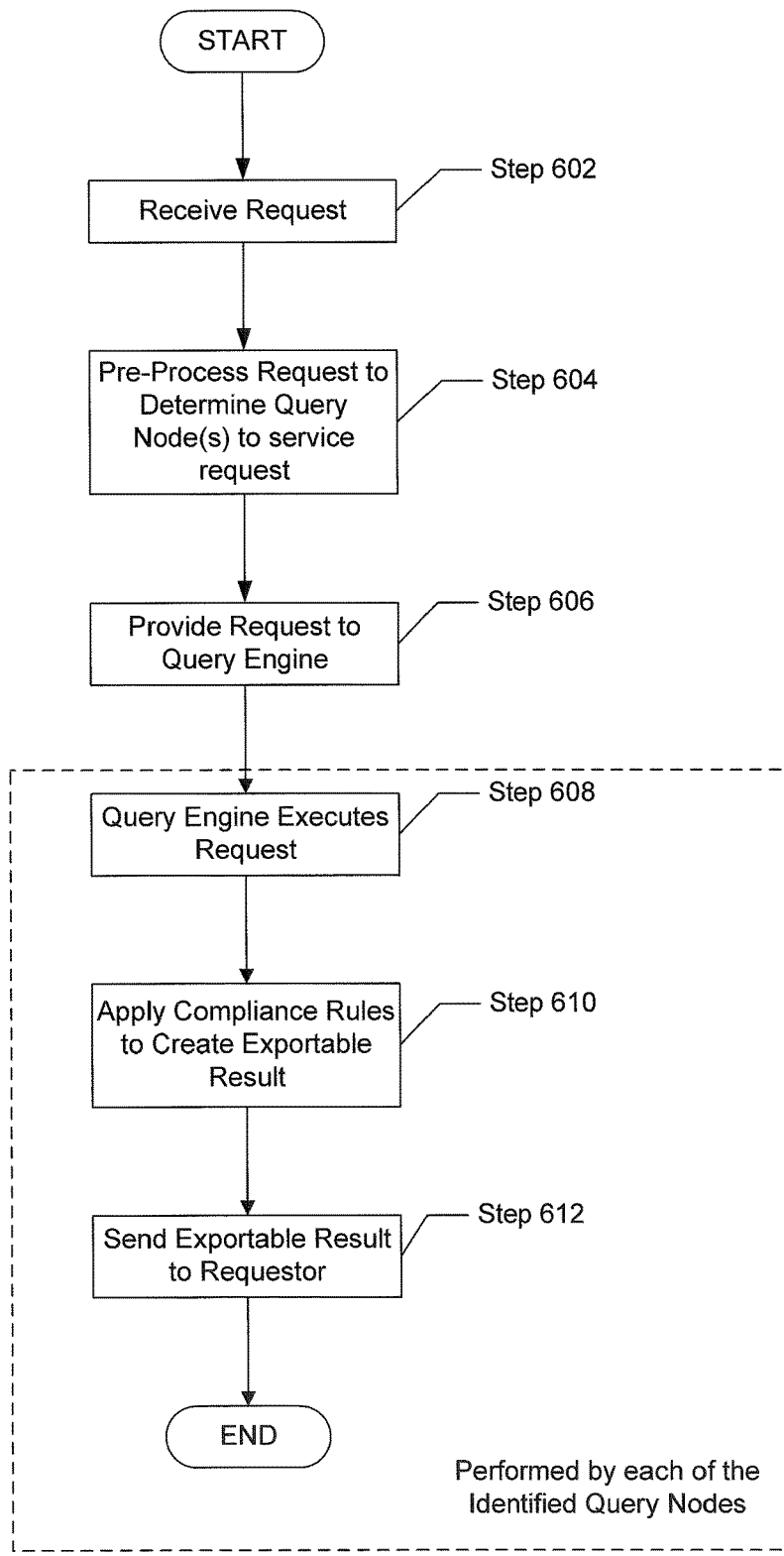
FIG. 6 shows an example method for requesting data in accordance with one or more embodiments of the technology.

In one or more embodiments in accordance with FIG. 1, the query nodes (110A-C) correspond to one or more computing devices (see e.g. FIG. 10) that include functionality to process queries (see e.g., FIGS. 4 and 6). Additional detail about the query nodes is provided in FIG. 3.

In one or more embodiments, each geographic location (104A), (104B), and (104C) represents a different country (i.e. United States, Russia, Canada, Germany). However, those skilled in the art will appreciate that the geographic locations are not restricted solely to countries. For example, the geographic locations could also be cities, states, floors of a building, or boundaries established by sets of GPS coordinates.

Further, while FIG. 1 shows query nodes distributed across geographic boundaries, the embodiments of the technology may be implemented using query nodes associated with given portions (e.g., departments) in a company (see e.g. FIG. 8 below). For example, a doctor's office may restrict particular data from being retrieved by another doctor's office or insurance company. In another example, certain data may be restricted only to human resources personnel and not available to maintenance personnel. In one or more embodiments, the compliance rules may also be related to levels of security clearance within an organization. Alternatively, the compliance rules may also be related to one or more network domain policies.

In one or more embodiments of the technology, a client (100A, 100M) may be any computer system or process executing on a computer system that issues a read request over to a query node (110A-C) over the network (102). In one embodiment of the technology, the clients (100A, 100M) may each include a processor (not shown), memory (not shown), and persistent storage (not shown). In one embodiment of the technology, the clients may be implemented using computing devices shown in FIG. 10.

In one or more embodiments, the query nodes (110A-C) are connected via the network (102). Additionally, each of the clients (100A, 100M) may also be connected to each other or the query nodes (110A-C) through the network (102). The network (102) may be wired network, a wireless network, or any combination thereof. Further, the network (102) may be a wide area network (e.g., the Internet) or a local area network (LAN).

Figure 2:
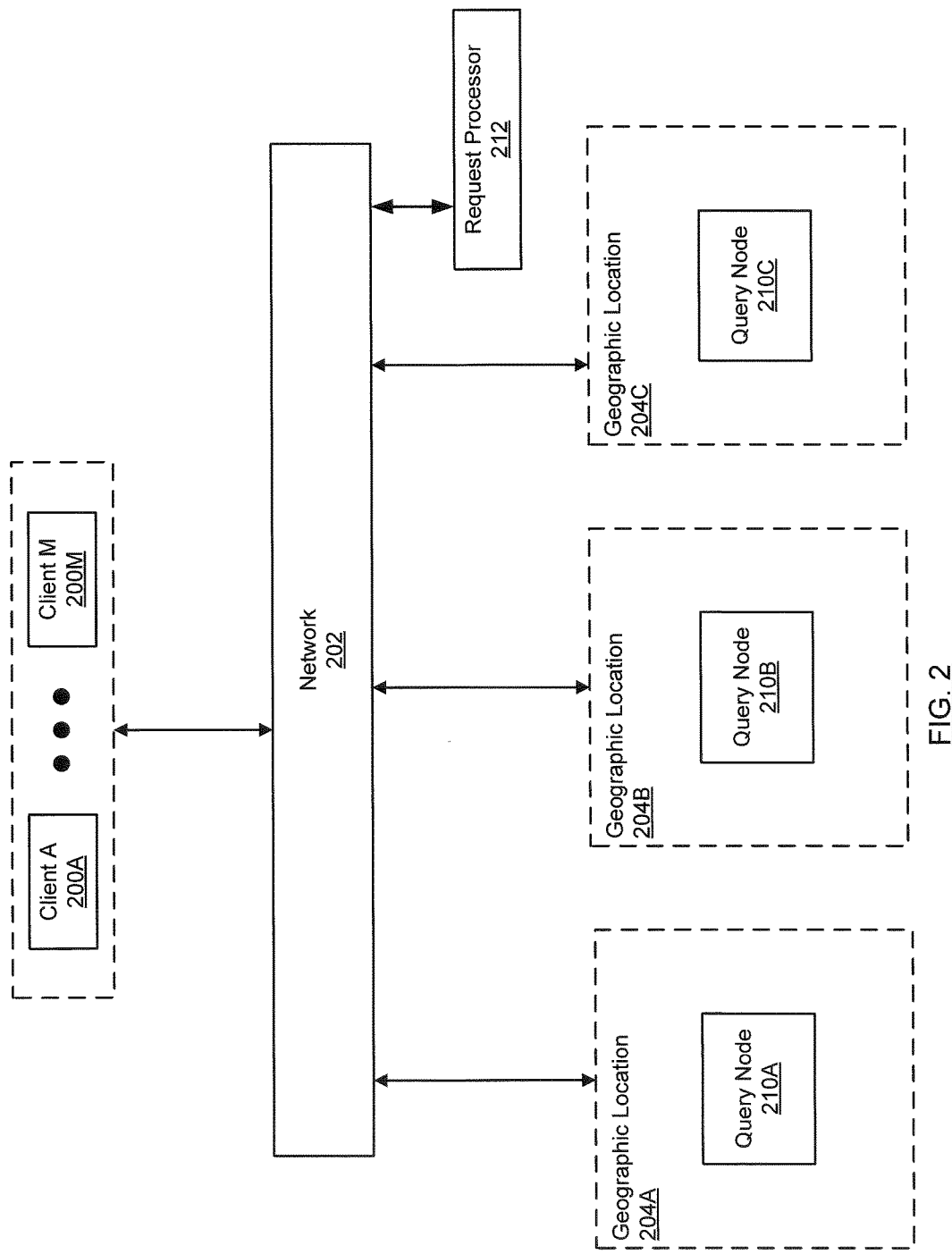
FIG. 2 shows another example system in accordance with one or more embodiments of the technology.

FIG. 2 shows an example system in accordance with one or more embodiments of the technology. As shown in FIG. 2, the system includes one or more clients (200A, 200M), a network (202), a request processor (212) and one or more query nodes (210A-C) in different geographic locations (204A-C). Each of these components is described below.

In one or more embodiments in accordance with FIG. 2, the query nodes (210A-C) are substantially similar to the query nodes described in FIG. 1; however, the query nodes shown in FIG. 2 may not each include their own request processor (see e.g. FIG. 3, 312). In one or more embodiments the query nodes (210A-C) may be connected to a request processor (212). More specifically, in one or more embodiments, the request processor (212) may be a single request processor servicing requests from all of the query nodes (210A-C). Alternatively, there may be a set of request processors, for example, one located in in each of the geographic locations (204A), (204B), and (204C).

In one embodiment of the technology, the request processor (212) includes functionality to track what data (or types of data) are stored in each of the local repositories (FIG. 3, 302) maintained by the individual query nodes (see e.g., FIG. 3 300). The request processor (212) may obtain this information from the individual query nodes. Alternatively, the request processor(s) may obtain the aforementioned information from another source. The request processor (212) may use this information to implement at least a portion of the method shown in FIG. 6 and the functionality described in FIGS. 7A-8.

In one or more embodiments of the technology, a client (200A, 200M) may be any computer system or process executing on a computer system that issues a read request over to the request processor (212) over the network (202). In one embodiment of the technology, the clients (200A, 200M) may each include a processor (not shown), memory (not shown), and persistent storage (not shown). In one embodiment of the technology, the clients may be implemented using computing devices shown in FIG. 10.

In one or more embodiments, the query nodes (210A-C) are connected by the network (202). Additionally, each of the clients (200A, 200M) may also be connected to each other, the request processor (212), or the query nodes (210A-C) through the network (202). The network (202) may be wired network, a wireless network, or any combination thereof. Further, the network (202) may be a wide area network (e.g., the Internet) or a local area network (LAN).

FIG. 3 shows an example of a query node in accordance with one or more embodiments of the technology. As shown in FIG. 3, the query node (300) may include a local repository (302), a query engine (304), which includes a compliance engine (308), and optionally a request processor (312). Each of these components is described below.

As discussed above, in one or more embodiments of the technology the request processor (312) may reside inside the query node (300) itself or there may be one or more external request processors distributed throughout the various geographic locations and network connections.

In one embodiment of the technology, local repository (302) includes persistent storage (e.g., solid state storage, magnetic storage, optical storage, any other type of persistent storage or any combination thereof) in which data (described below) is stored.

Continuing with the discussion of the local repositories, each local repository may store data using any known or subsequently discovered mechanism. The following describes various examples of the mechanisms that may be used to store data. The examples are not intended to limit the technology. In a first example, the local repository may be a set of magnetic hard disks. In a second example, the local repository may be implemented using a computer cluster that is executing a distributed file system. In a third example, the local repository may be implemented using a network file server and one or more block-storage devices (i.e., as a Storage Area Network).

In one embodiment of the technology, the data may be structured and/or unstructured data that corresponds to any type of content that may be stored in the data repository. Examples of content may include, but are not limited to, text files, audio files, image files, relational databases records, eXtensible Markup Language (XML) archives, spreadsheets, and hash tables and/or audio-visual files. Further, the local repository may also store metadata associated with the content. Examples of metadata may include, but are not limited to, author, content name, creation time, creation date, size of object, modification time, modification date, content format, e.g., portable document format (PDF), MPEG-4, .txt., etc.

In one or more embodiments, the query engine (304) is a service or process that includes functionality to service requests issued by clients and/or request processors in accordance with FIGS. 4 and 6 below. More specifically, the query engine includes functionality to evaluate a request and determine whether any data for that request is present in the local repository. If the data is present in the local repository the query engine is configured to retrieve the data from the local repository. Further, the query engine may include functionality to process the retrieved data prior to providing the retrieved data to the compliance engine or the client (or request processor) that issued the request. In one embodiment of the invention, the query engine may be implemented using specialized hardware. Additional detail about the functionality of the query engine is described below in FIGS. 4-8.

In one embodiment of the technology, the request processor (312) includes functionality to receive requests from clients and/or other query nodes and then determine whether the query node (i.e., the query node in which the request processor is located) includes the data necessary to satisfy the request. If any of the data is present on the query node, then the request processor may forward the request (or a modified version of the request) to the query node to service. Further, for any portion of the request that needs to be processed by another query node (i.e., the current query node does not include the data necessary to the service the request), the request processor includes functionality to send the request (or a modified version of the request) to another query node. The request processor may also include functionality to aggregate the data received from the various query nodes and to provide the aggregate data to the client. Additional detail about the operation of the request processor (312) is provided in FIGS. 4-5 below.

In one or more embodiments, the query engine (304) has a compliance engine (308), which includes functionality to enforce compliance rules. More specifically, in one or more embodiments, the compliance engine (308) maintains a repository of compliance rules. In one or more embodiments, a compliance rule specifies: (i) a requestor location, (ii) a location of data, (iii) a type of the data, and (iv) a rule to apply when all or some of conditions (i)-(iii) are satisfied. For example, a compliance rule may pertain to the origin of the request from a remote client or node having a particular set of restrictions. Alternatively, a compliance rule may relate to the sensitivity level of the data itself. In one embodiment of the technology, the compliance engine may define several compliance-related data manipulation rules based on the sequence of operations a particular resulting dataset has undergone. Depending on the type of data (also referred to as data type) and the compliance rules that have been configured for that data, particular fields may be eliminated from the resulting dataset. Alternatively, a compliance rule may also enforce that a particular field be masked or tokenized. Further, a compliance rule may enforce that only a count of the number of entries for a particular field is returned. In other words, the compliance engine may apply the compliance rules to a retrieved dataset removing or altering data based upon the rule and ultimately create a resulting exportable dataset.

In one or more embodiments, the compliance engine may process individual fields or values as they are retrieved from the local repository by the query engine. Said another way, the compliance engine may process the results as they are being obtained from the local repository. In another embodiment of the invention, the compliance engine within the query engine does not process the results until a complete set of results obtained from the local repository. The query node (300) then transmits the exportable result to the requesting entity.

In one embodiment of the technology, the compliance rules may be based on specific geographic locations and boundaries. In one or more embodiments the abovementioned compliance engine for a given geographic location may only execute within that geographic location, thus ensuring that sensitive data never leaves that particular jurisdiction.

Additional detail related to the operation of the compliance engine is described below with respect to FIGS. 4-9.

As described above, in one embodiment, each query node may be implemented using one or more computing devices. In another embodiment, the query engine, request processor, and compliance engine may be implemented in a single computing device operatively connected to the local repository. While various examples of how the query may be implemented have been provided, those skilled in the art will appreciate that the query nodes (300) may be implemented using any combination of software and/or hardware without departing from the technology.

While FIGS. 1-3 show a configuration of components, other configurations may be used without departing from the scope of the technology. For example, various components may be combined to create a single component. As another example, the functionality performed by a single component may be performed by two or more components.

Further, while FIGS. 1-3 show a single query node per-geographic region, each geographic region may have multiple query nodes. Further, each query node may have multiple local repositories, multiple compliance engines, multiple query engines, and multiple request processors.

While the various steps in the following flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 4 shows an example method for processing requests by a query node according to one or more embodiments of the technology. The method shown in FIG. 4 may be implemented, for example, using the system shown in FIG. 1.

Turning to FIG. 4, in step 402, the query node receives a request (also referred to as a query request) for data. The request may be received from a requestor, which may be a client, a query node, or another external entity.

In step 404 the query node pre-processes the request to determine the location of the data to service the request and the location of the requestor. In one or more embodiments, the pre-processing may be performed by a request processor in the query node. As discussed above, the request processor may include functionality to determine where the data to service the request is located.

In step 406, a determination is made as to whether any portion of the data to service the request resides in the local repository (i.e. the data is local to the query node that received the request in Step 402). If all the data resides locally, the process proceeds to step 408. If all the data resides remotely, the process proceeds to step 420. In one or more embodiments, requests may contain portions of data located both locally and remotely. In such scenarios, the request may be serviced by performing some or all of steps 408-418 to obtain data from the local repository and some or all of steps 420-426 to obtain data from other query nodes.

In step 408, the query node provides the request to the query engine. In step 410, the query engine executes the request on the local repository to retrieve the requested data (also referred to as the query result). In one or more embodiments, the query engine stores query execution data (QED) related to the processing of the query. For example, in one or more embodiments the query engine tracks the locations of the field(s) selected, retrieved, modified, or updated as part of servicing the query request and stores this information and any other information related to the processing of the fields to service the query request.

In step 412, a determination is made as to whether the requestor is local (e.g., the requestor is in the same geographic location as the query node). If the requestor is local, the process proceeds to step 414; otherwise the process proceeds to step 416. In one embodiment of the invention, the determination in step 412 is performed in order to account for scenarios in which the request in 402 is received from another query engine that is not local. See e.g., FIG. 5.

In step 414, the data retrieved from the local repository is transmitted to the requestor and the process ends. In step 416, the retrieved data is provided to the compliance engine of the query node (i.e., the query node in which the local repository is located). As discussed above, the compliance engine retrieves any compliance rules related to, for example, the location of the requestor or the sensitivity level of the data. Furthermore, in one or more embodiments the compliance engine may retrieve any compliance rules based on the QED instead or in addition to query result. For example, consider a scenario in which a query request is for a count of a certain type of field in a table (e.g. an employee record). In this scenario, the query engine selects all of the fields having the employee record type, computes a count of the selected fields, and returns the count along with the associated query execution data (i.e. what fields the query engine had to use to arrive at the count). However, if a requestor was not allowed access to the underlying employee record fields, then a compliance rule based on the query execution data may also deny access to the resulting count. Thus, in one or more embodiments, the query result may also be manipulated by one or more compliance rules applied to the query execution data.

Continuing with step 416, the compliance engine then applies the compliance rules to the query result (and/or the underlying query execution data) to create an exportable result. As also discussed above, this may entail the compliance engine removing portions of the data not allowed to be transmitted, masking portions of the data, or otherwise modifying the data to enforce compliance regulations. In step 418, the exportable result is transmitted to the requestor and the process ends.

Returning to step 406, if a determination is made that any portion of the data resides remotely the process proceeds to step 420. In step 420, the request is transmitted to the query node (also referred to as a remote query node) containing the portion of the data.

In step 422, the remote query node provides the request to its local query engine (i.e., the query engine in the remote query node). In step 424, the query engine executes the request on its local repository (i.e., the local repository in (or associated with) the remote query node) to retrieve the requested data.

In step 424, the retrieved data is provided to the compliance engine of the remote query node. In one or more embodiments, steps 422 and 424 may be carried out in parallel. In other words, the compliance engine may process data as it is retrieved by the query engine. Alternatively, in one or more embodiments the compliance engine may process query result after it is retrieved from the local repository. As discussed above, the compliance engine retrieves any compliance rules related to, for example, the location of the requestor or the sensitivity level of the data. The compliance engine then applies the compliance rules to the query result (and/or to the underlying query execution data) to create an exportable result. As also discussed above, this may entail the compliance engine removing portions of the data not allowed to be transmitted, masking portions of the data, or otherwise modifying the data to enforce compliance regulations. In step 426, the exportable result is transmitted to the requestor.

If the data to service the request received in step 402 is distributed across multiple remote query nodes, then steps 420-426 may be performed serially or in parallel for each remote query node that includes data to service the request.

Figure 5:
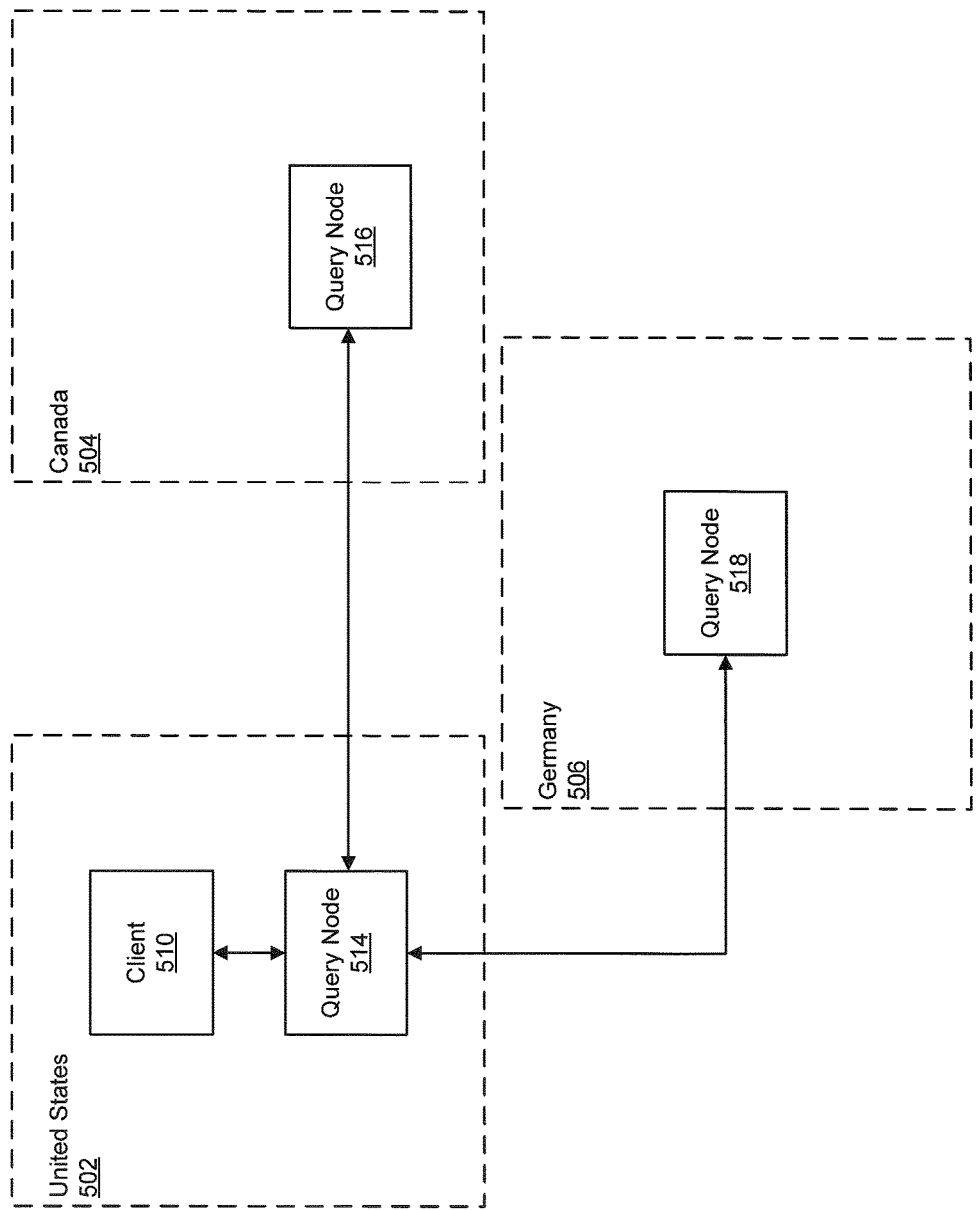
FIG. 5 shows an example in accordance with one or more embodiments of the technology.

FIG. 5 shows an example in accordance with one or more embodiments of the technology. The example shown in FIG. 5 illustrates various embodiments of the technology. The example is not intended to limit the scope of the technology.

Turning to the example, consider a scenario in which there are three geographic locations: the United States (502), Canada (504), and Germany (506). Further, in this example assume that a client (510) located in the United States issues a request to its local query node (514) (i.e. the query node in the United States). For the purposes of the example, the client is requesting employee data (e.g. names and addresses) from each of the United States (502), Canada (504), and Germany (506).

The query node (514) receives and pre-processes the request to determine the location of the requestor and the location(s) of the requested data. Based on the determination that the locations of the requested data are both local and remote, the query node (514) first turns to the local data. The query node (514) transmits the request to its local query engine (not shown), which retrieves the data from the local repository (not shown). As the client (510) is local to the United States query node (514), the query node (514) transmits the locally retrieved data containing all of the employee records to the client (514).

Turning to the remote data, the query node (514) transmits a request for data to the query node (516) in Canada (504). The Canadian query node (516) receives the request and pre-processes the request to determine the location of the requestor and the location of the requested data. Based on the determination that the requested data is local to Canada (504), the query node (516) transmits the request to its local query engine (not shown), which retrieves the data from the local repository (not shown).

As the requestor (i.e., the United States query node (514)) is considered remote to the Canadian query node (516), the query engine in the Canadian query node (516) provides the retrieved data to a compliance engine (not shown) in the query node (516). As discussed above, the compliance engine retrieves any compliance rules related to, for example, the location of the requestor or the sensitivity level of the data. For the purposes of this example, a compliance rule exists indicating that employee address information may not leave the country. Therefore, the compliance engine will remove the data pertaining to employee addresses from the retrieved data and create an exportable result containing only employee names. The exportable result containing the employee names is then transmitted back to the United States query Node (514) which, in turn, transmits the exportable result to the client (510).

Finally, a request is issued to query node (518) in Germany (506). The German query node (518) receives the request and pre-processes the request to determine the location of the requestor and the location of the requested data. Based on the determination that the requested data is local to Germany (506), the query node (518) transmits the request to its local query engine (not shown), which retrieves the data from the local repository (not shown).

As the requestor (i.e., the United States query Node (514)) is considered remote to Germany (506), the query engine in the German query Node (518) provides the retrieved data to a compliance engine (not shown) in the German query Node (518). As discussed above, the compliance engine retrieves any compliance rules related to, for example, the location of the requestor or the sensitivity level of the data. For the purposes of this example, a compliance rule exists indicating that no employee information may leave the country except for a count of the number of employees. Therefore, the compliance engine will tokenize the retrieved data, obtain a count of the employees, and create an exportable result containing only the count. The exportable result containing the count is then transmitted to the United States query Node (514) which, in turn, transmits the exportable result to the client (510).

FIG. 6 shows an example method for requesting data from a query node according to one or more embodiments of the technology. The method shown in FIG. 4 may be implemented, for example, using the system shown in FIG. 2.

Turning to FIG. 6, in step 602, a request processor (see e.g., FIG. 2) receives a request for data from a client or a query node. In step 604, the request processor pre-processes the request to determine the location of query nodes that may include data necessary to service the request.

In step 606, the request processor issues a request to each query engine identified in step 604, where each request includes information about the client that issued the request in step 602. The information may include, for example, the location of the client and information that may be used by a query node to directly communicate with the client. See e.g., step 612.

Steps 608-612 are performed by each of the query nodes identified in step 604.

In step 608, the query node receives the request and provides it to its local query engine. The local query engine subsequently executes the request on its local repository to retrieve the requested data.

In step 610, the retrieved data is provided to the compliance engine of the query node. As discussed above, the compliance engine retrieves any compliance rules related to, for example, the location of the requestor or the sensitivity level of the data. The compliance engine then applies the compliance rules to create an exportable result. As also discussed above, this may entail the compliance engine removing portions of the data not allowed to be transmitted, masking portions of the data, or otherwise modifying the data package to enforce compliance regulations. The compliance engine uses information in the request received by the query node in step 608 to determine which rule(s) to apply.

In step 612, the exportable result may be transmitted directly to the client that issued the original request in step 602 or may be transmitted to the request processor, which, in turn, provides the exportable result to the client.

The following section describes various examples in accordance with one or more embodiments of the technology. The examples are not intended to limit the scope of the technology.

FIG. 7A shows an example in accordance with one or more embodiments of the technology.

In this example, there are three geographic locations: the United States (702), Russia (708), and Germany (706). For the purposes of this example, the request processor (712), i.e. an intermediate requestor, resides somewhere outside of Russia (708). In one or more embodiments according to the example, a client (710), i.e. a source requestor, located in Russia issues a request for data to the request processor (712).

The request processor (712) pre-processes the request to determine the location(s) of the requested data. The request processor (712) then transmits requests to a query processor in each of the jurisdictions containing requested data. In one or more embodiments, the request processor (712) may transmit the entire request to each jurisdiction, or the request processor (712) may form a new request specific to the data that is stored in each of the local repositories. Additionally, in one or more embodiments, the request processor (712) may include information identifying the source requestor to the request(s).

Turning to Russia (708), the query node (716) receives the request from the request processor (712). The query node (716) transmits the request to its local query engine (not shown), which processes the request in order to retrieve the data from the local repository (not shown). As the client (710) is identified as local to Russia (708), the query node (716) transmits the locally retrieved data containing all of the employee records to the client (710), i.e. the source requestor.

Turning to the United States (702), the query node (714) receives the request from the request processor (712). The query node (714) transmits the request to its local query engine (not shown), which processes the request in order to retrieve the data from the local repository (not shown).

As the client (710) is considered remote to the United States (702), the query engine provides the retrieved data to a compliance engine (not shown) in the query node (714). As discussed above, the compliance engine retrieves any compliance rules related to, for example, the location of the requestor or the sensitivity level of the data. For the purposes of this example, a compliance rule exists indicating that only names and state residence information may be transmitted to Russia. Therefore, the compliance engine will mask the retrieved data to only show names and the state of each employee thereby creating an exportable result containing only employee names and states of residence. The exportable result containing the employee names and states of residence is then transmitted to the client (710), i.e. the source requestor.

Turning to Germany (706), the query node (718) receives the request from the request processor (712). The query node (718) then transmits the request to its local query engine (not shown), which processes the request in order to retrieve the data from the local repository (not shown).

As the client (710) is considered remote to Germany (706), the query engine provides the retrieved data to a compliance engine (not shown) in the query node (718). As discussed above, the compliance engine retrieves any compliance rules related to, for example, the location of the requestor or the sensitivity level of the data. For the purposes of this example, a compliance rule exists indicating that no personally identifying employee information may leave the country. Therefore, the compliance engine will mask the retrieved data to only show employee ID numbers and create an exportable result containing only the employee ID numbers. The exportable result containing the employee ID numbers is then transmitted by the query node (718) to the client (710), i.e. the source requestor.

Figure 7B:
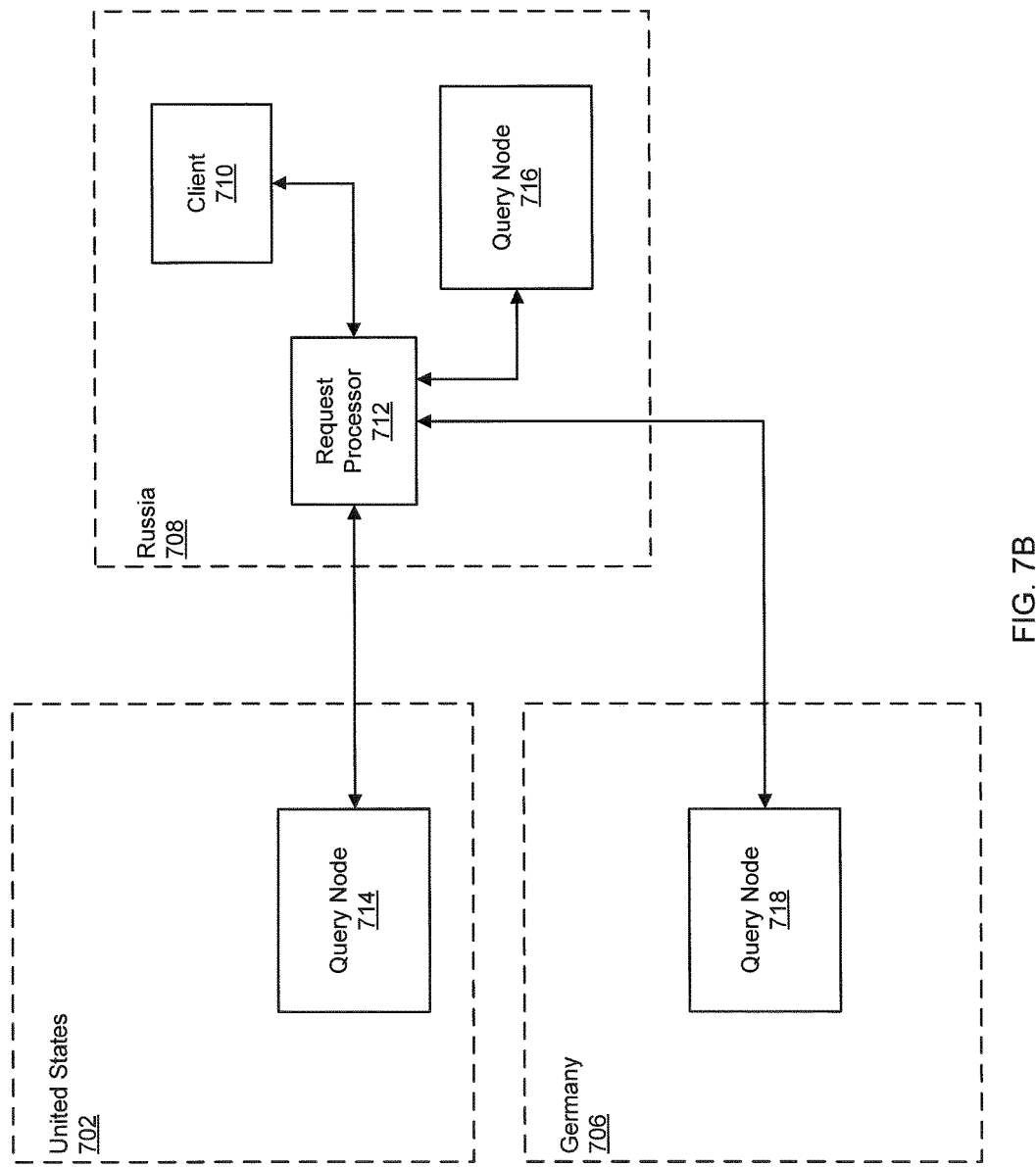
FIG. 7B shows an example in accordance with one or more embodiments of the technology.

FIG. 7B shows an example in accordance with one or more embodiments of the technology.

In this example, there are three geographic locations: the United States (702), Russia (708), and Germany (706). For the purposes of this example, the request processor (712), i.e. an intermediate requestor, resides inside of Russia (708). In one or more embodiments according to the example, a client (710), i.e. a source requestor, located in Russia issues a request for data to the request processor (712). In one or more embodiments in accordance with this example, the request processor (712) may receive and/or aggregate requested data, for example, because it is located in the same jurisdiction as the client (710).

The request processor (712) pre-processes the request to determine the location(s) of the requested data. The request processor (712) then transmits requests to each jurisdiction that includes a query node that includes data necessary to service any portion of the request. In one or more embodiments, the request processor (712) may transmit the entire request to each jurisdiction or the request processor (712) may form a new request specific to each query node. Additionally, in one or more embodiments, the request processor (712) may include information identifying the source requestor in the requests.

Turning to Russia (708), the query node (716) receives the request from the request processor (712). The query node (716) transmits the request to its local query engine (not shown), which processes the request and retrieves the data from the local repository (not shown). As the client (710) is identified as local to Russia (708), the query node (716) transmits the locally retrieved data containing all of the employee records to the request processor (712), i.e. the intermediate requestor. The request processor (712) then transmits the locally retrieved data containing all of the employee records to the client (710), i.e. the source requestor.

Turning to the United States (702), the query node (714) receives the request from the request processor (712). The query node (714) then transmits the request to its local query engine (not shown), which processes the request and retrieves the data from the local repository (not shown).

As the client (710) is considered remote to the United States (702), the query engine provides the retrieved data to a compliance engine (not shown) in the query node (714). As discussed above, the compliance engine retrieves any compliance rules related to, for example, the location of the requestor or the sensitivity level of the data. For the purposes of this example, a compliance rule exists indicating that only names and state residence information may be transmitted to Russia. Therefore, the compliance engine will mask the retrieved data to only show names and the state of each employee thereby creating an exportable result containing only employee names and states of residence. The exportable result containing the employee names and states of residence is then transmitted to the request processor (712), i.e. the intermediate requestor. The request processor (712) then transmits the exportable result to the client (710).

Turning to Germany (706), the query node (718) receives the request from the request processor (712). The query node (718) then transmits the request to its local query engine (not shown), which processes the request and retrieves the data from the local repository (not shown).

As the client (710) is considered remote to Germany (706), the query engine provides the retrieved data to a compliance engine (not shown) in the query node (718). As discussed above, the compliance engine retrieves any compliance rules related to, for example, the location of the requestor or the sensitivity level of the data. For the purposes of this example, a compliance rule exists indicating that no personally identifying employee information may leave the country. Therefore, the compliance engine will mask the retrieved data to only show employee ID numbers and create an exportable result containing only the employee ID numbers. The exportable result containing the employee ID numbers is then transmitted to the request processor (712), i.e. the intermediate requestor. The request processor (712) then transmits the exportable result to the client (710).

In one or more embodiments, the request processor (712) may perform the transmission steps in various arrangements. Specifically, the request processor (712) may transmit received data to a client or query node as soon as it is received. Alternatively, the request processor (712) may wait until all or substantial portions of the data for a given request has been fulfilled, aggregate the data, and then transmit the completed request to the source requestor.

Figure 8:
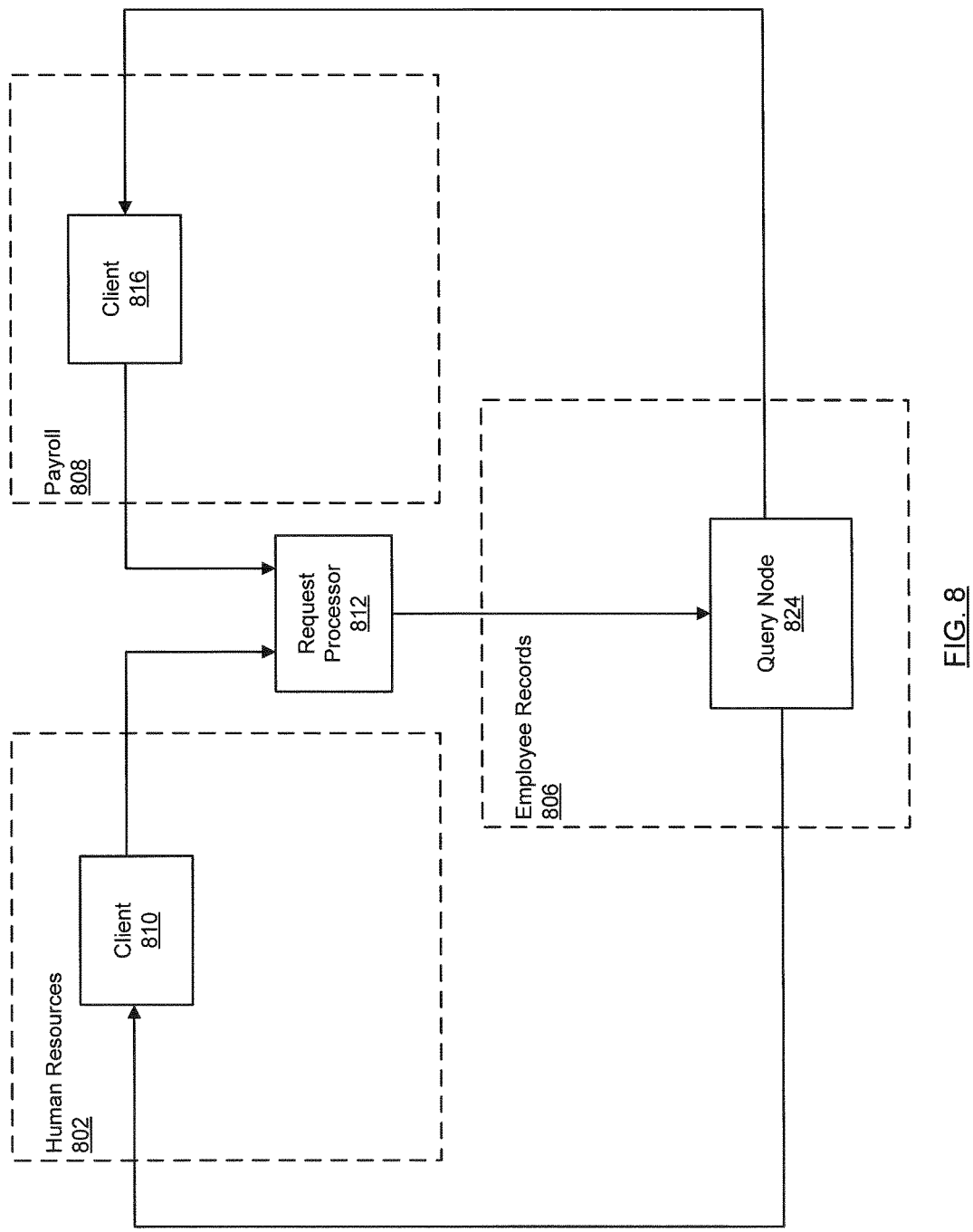
FIG. 8 shows an example in accordance with one or more embodiments of the technology.

FIG. 8 shows an example in accordance with one or more embodiments of the technology.

In this example, there are three different departments within a business organization: Human Resources (802), Payroll (808) and Employee Records (806). In one or more embodiments according to the example, a client (810) within the Human Resources (802) department issues a request for employee records data to the request processor (812).

The request processor (812) pre-processes the request to determine the location(s) of the requested data. Based on the determination that the requested data is in Employee Records (806), the request processor (812) then transmits the request to query node (824). In one or more embodiments, the request processor (812) may transmit the entire request or may form a new request specific to the query node. Additionally, in one or more embodiments, the request processor (812) includes information identifying the source requestor.

The query node (824) receives the request from the request processor (812). The query node (824) then transmits the request to its local query engine (not shown), which processes the request in order to retrieve the employee records data from the local repository (not shown).

As the client (810) is in a different department from Employee Records (806), the query engine provides the retrieved data to a compliance engine (not shown) in the query node (824). As discussed above, the compliance engine retrieves any compliance rules related to, for example, the location of the requestor or the sensitivity level of the data. For the purposes of this example, a compliance rule exists indicating that clients located in Human Resources (802) may only retrieve employee names and performance records. Therefore, the compliance engine filters the retrieved data to remove everything except employee names and performance records thereby creating an exportable result. The exportable result containing the employee names and performance records is then transmitted by the query node (824) back to the client (810).

In one or more further embodiments according to the example, a client (816) within Payroll (808) issues a request for employee records data to the request processor (812).

The request processor (812) pre-processes the request to determine the location(s) of the requested data. Based on the determination that the requested data is in Employee Records (806), the request processor (812) then transmits the request to query node (824). In one or more embodiments, the request processor (812) may transmit the entire request or may form a new request specific to the query node. Additionally, in one or more embodiments, the request processor (812) includes information identifying the source requestor.

In one or more embodiments, the query node (824) receives the request from the request processor (812). The query node (824) then transmits the request to its local query engine (not shown), which processes the request in order to retrieve the employee records data from the local repository (not shown).

As the client (816) in a different department from Employee Records (806), the query engine provides the retrieved data to a compliance engine (not shown) in the query node (824). As discussed above, the compliance engine retrieves any compliance rules related to, for example, the location of the requestor or the sensitivity level of the data. For the purposes of this example, a compliance rule exists indicating that clients located in Payroll Department (808) department may only retrieve employee salary information. Therefore, the compliance engine will filter the retrieved data to remove everything except employee salary information thereby creating an exportable result. The exportable result containing the employee salary information is then transmitted by the query node (824) to the client (816).

In one or more embodiments in accordance with the technology, query requests are routed from a client to one or more clients to one or more query nodes. In other words, in one or more embodiments discussed above, the query node(s) maintain routing information to process requests from clients and issue requests to any other query nodes that may contain the requested information. See e.g. FIGS. 4-5.

In one or more alternative embodiments, one or more request processors receive query requests from client(s) and route the requests to the appropriate query nodes. In other words, in one or more embodiments discussed above, the request processor(s) maintain routing information to process requests from clients and issue requests to any query nodes that may contain the requested information. See e.g. FIGS. 6-8.

In one or more alternative embodiments, client(s) may issue one or more requests directly to one or more query nodes. In other words, in one or more embodiments discussed below, the clients themselves maintain the necessary information to issue requests to any query nodes that may contain the requested information.

Figure 9:
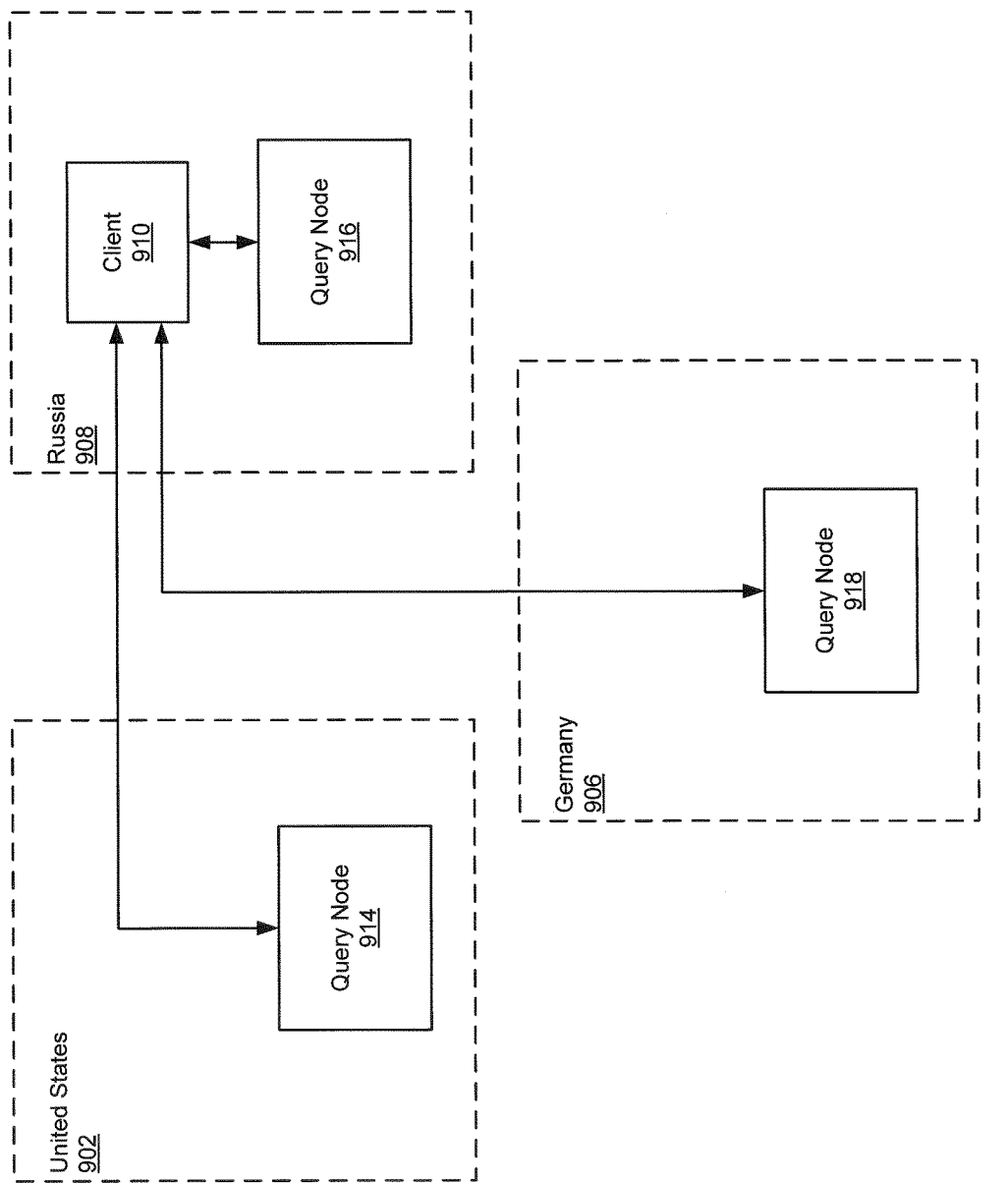
FIG. 9 shows an example in accordance with one or more embodiments of the technology.

FIG. 9 shows an example in accordance with one or more embodiments of the technology. More specifically, FIG. 9 shows an example in which the client directly sends requests to the query nodes.

In this example, there are three geographic locations: the United States (902), Russia (908), and Germany (906). The client (910) then transmits requests directly to a query node in each of the jurisdictions containing requested data. In one or more embodiments, the client (910) may transmit an entire request to each jurisdiction, or the client (910) may form a request specific to the data that is stored in each of the local repositories. Additionally, in one or more embodiments, the client (910) may include information identifying the source requestor to the request(s).

Turning to Russia (908), the query node (916) receives the request from the client (910). The query node (916) transmits the request to its query engine (not shown), which processes the request in order to retrieve the data from the local repository (not shown). As the client (910) is identified as local to Russia (908), the query node (916) transmits the locally retrieved data containing all of the employee records to the client (910).

Turning to the United States (902), the query node (914) receives the request from the client (910). The query node (914) transmits the request to its query engine (not shown), which processes the request in order to retrieve the data from the local repository (not shown).

As the client (910) is considered remote to the United States (902), the compliance engine (not shown) in the query node (914) processes the retrieved data using one or more compliance rules. As discussed above, the compliance engine retrieves any compliance rules related to, for example, the location of the requestor or the sensitivity level of the data. For the purposes of this example, a compliance rule exists indicating that only names and state residence information may be transmitted to Russia. Therefore, the compliance engine will mask the retrieved data to only show names and the state of each employee thereby creating an exportable result containing only employee names and states of residence. The exportable result containing the employee names and states of residence is then transmitted to the client (910).

Turning to Germany (906), the query node (918) receives the request from the client (910). The query node (918) then transmits the request to its query engine (not shown), which processes the request in order to retrieve the data from the local repository (not shown).

As the client (910) is considered remote to Germany (906), the compliance engine (not shown) in the query node (918) processes the retrieved data using one or more compliance rules. As discussed above, the compliance engine retrieves any compliance rules related to, for example, the location of the requestor or the sensitivity level of the data. For the purposes of this example, a compliance rule exists indicating that no personally identifying employee information may leave the country. Therefore, the compliance engine will mask the retrieved data to only show employee ID numbers and create an exportable result containing only the employee ID numbers. The exportable result containing the employee ID numbers is then transmitted by the query node (918) to the client (910).

Figure 10:
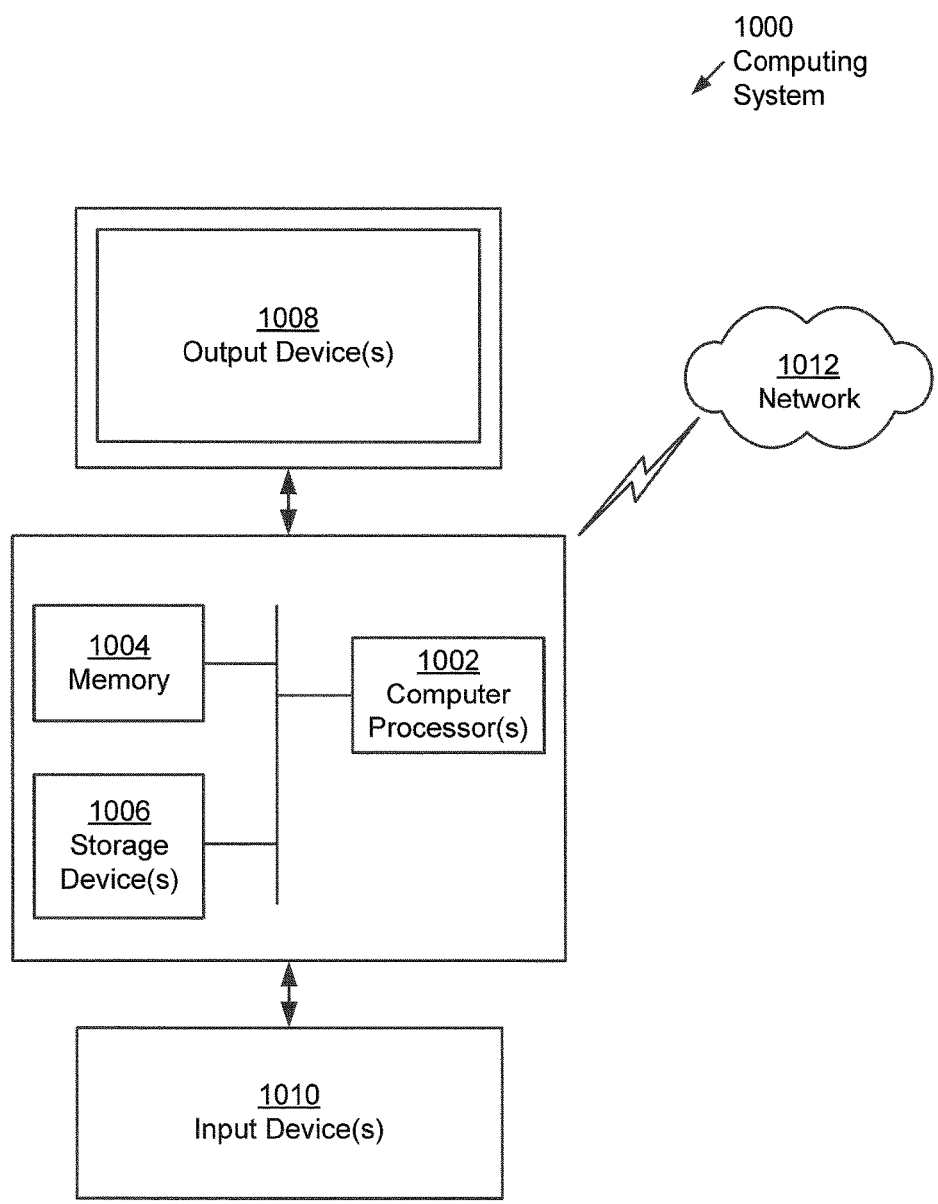
FIG. 10 shows a computing system in accordance with one or more embodiments of the technology.

FIG. 10 shows a computing system in accordance with one or more embodiments of the technology.

Embodiments of the technology may be implemented on a computing system. Any combination of mobile, desktop, server, embedded, or other types of hardware may be used. For example, as shown in FIG. 10, the computing system (1000) may include one or more computer processor(s) (1002), associated memory (1004) (e.g., random access memory (RAM), cache memory, flash memory, etc.), one or more storage device(s) (1006) (e.g., a hard disk, an optical drive such as a compact disk (CD) drive or digital versatile disk (DVD) drive, a flash memory stick, etc.), and numerous other elements and functionalities. The computer processor(s) (1002) may be an integrated circuit for processing instructions. For example, the computer processor(s) may be one or more cores, or micro-cores of a processor. The computing system (1000) may also include one or more input device(s) (1010), such as a touchscreen, keyboard, mouse, microphone, touchpad, electronic pen, or any other type of input device. Further, the computing system (1000) may include one or more output device(s) (1008), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1000) may be connected to a network (1012) (e.g., a local area network (LAN), a wide area network (WAN) such as the Internet, mobile network, or any other type of network) via a network interface connection (not shown). The input and output device(s) may be locally or remotely (e.g., via the network (1012)) connected to the computer processor(s) (1002), memory (1004), and storage device(s) (1006). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (1000) may be located at a remote location and connected to the other elements over a network (1012). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

In one or more embodiments, a record of any queries executed by the query nodes may be maintained in local or global logs depending on compliance restrictions. In one or more embodiments, the result dataset is stored together with the applied compliance rules and the field operation audit log as proof that the compliance rules were enforced during query operations.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for requesting data comprising:
receiving, by a first query node, a local query request to read a first data of the data;
making a determination that the first data comprises a local portion and a remote portion;
in response to the determination:
   executing the local query request by a query engine in a first geographic location in which a first requestor that sent the local query request is located, to obtain a first query result, wherein the first query result comprises the local portion;
   executing the local query request by a second query engine in a second geographic location, in which the first requestor that sent the local query request is not located, to obtain a second query result, wherein the second query result comprises the remote portion;
   obtaining a first compliance rule based on at least one of the first geographic location and the second geographic location;
   generating an exportable result by applying the first compliance rule to the second query result, wherein the exportable result does not include a portion of the remote portion, wherein the exportable result includes a count of a number of fields of the remote portion; and
   transmitting both of the first query result and the exportable result to the first requestor.

2. The method of claim 1, further comprising:
receiving, by the first query node, a remote query request to read a second data of the data;
making a second determination that the second data comprises a second local portion and a second remote portion;
in response to the second determination:
   executing the remote query request by the query engine in the first geographic location, in which a second requestor that sent the remote query request is not located, to obtain a third query result, wherein the third query result comprises the second local portion;
   obtaining a second compliance rule based on at least one of the first geographic location and the second geographic location;
   generating a second exportable result by applying the second compliance rule to the third query result, wherein the second exportable result does not include a portion of the second local portion, wherein the second exportable result includes a second count of a number of fields of the second local portion;
   executing the remote query request by the query engine in the second geographic location, in which the requestor that sent the remote query request is located, to obtain a fourth query result, wherein the fourth query result comprises the second remote portion;
   transmitting both of the fourth query result and the second exportable result to the second requestor.

3. The method of claim 1,
wherein the query engine is executing on a first query node,
wherein the first requestor is one selected from a group consisting of a client and a second query node.

4. The method of claim 1, wherein the first requestor is an intermediate requestor.

5. The method of claim 4, further comprising:
receiving, by the intermediate requestor, the exportable result; and
transmitting, by the intermediate requestor, the exportable result to a source requestor.

6. The method of claim 1, wherein executing the local query request by the query engine in the first geographic location generates query execution data.

7. The method of claim 6, wherein the query execution data comprises a list of the fields of the data that were selected, retrieved, modified, or updated as part of executing the local query request by the query engine in the first geographic location.

8. The method of claim 7, further comprising:
obtaining a second compliance rule based on the query execution data,
before transmitting the exportable result, removing a second portion of the remote portion specified by the second compliance rule.

9. A system comprising:
a first query node located in a first geographic location comprising a data repository, a query engine, and a compliance engine;
wherein the first query node is configured to:
   receive a local query request to read a first data;
   make a determination that the first data comprises a local portion and a remote portion;
   in response to the determination:
      execute, by the query engine, the local query request by the query engine to obtain a first query result, wherein the first query result comprises the local portion;
      execute the local query request by a second query engine in a second geographic location, in which a first requestor that sent the local query request is not located, to obtain a second query result, wherein the second query result comprises the remote portion;
      obtain, by the compliance engine, a first compliance rule based on at least one of the first geographic location, the second geographic location, and the query execution data;
      generate, by the compliance engine, an exportable result by applying the first compliance rule to the first query result, wherein the exportable result does not include a portion of the remote portion, wherein the exportable result includes a count of a number of fields of the remote portion, wherein the remote portion is not stored in the data repository; and
      transmit both of the first query result and the exportable result to the first requestor.

10. The system of claim 9, the first query node is further configured to:
receive a remote query request to read a second data of the data;
make a second determination that the second data comprises a second local portion and a second remote portion;

in response to the second determination:
execute the remote query request by the query engine in the first geographic location, in which a second requestor that sent the remote query request is not located, to obtain a third query result, wherein the third query result comprises the second local portion;
obtain a second compliance rule based on at least one of the first geographic location, the second geographic location;
generate a second exportable result by applying the second compliance rule to the third query result, wherein the second exportable result does not include a portion of the second local portion, wherein the second exportable result includes a second count of a number of fields of the second local portion;
execute the remote query request by the query engine in the second geographic location, in which the requestor that sent the remote query request is located, to obtain a fourth query result, wherein the fourth query result comprises the second remote portion;
transmit both of the fourth query result and the second exportable result to the second requestor.

11. The system of claim 9, wherein the first requestor is one selected from a group consisting of a client and a second query node.

12. The system of claim 9, wherein the first requestor is an intermediate requestor.

13. The system of claim 12, the first query node further configured to:
receive, by the intermediate requestor, the exportable result; and
transmit, by the intermediate requestor, the exportable result to a source requestor.

14. The system of claim 9, wherein executing the local query request by the query engine in the first geographic location generates query execution data.

15. The system of claim 14, wherein the first query node is further configured to:
obtain a second compliance rule based on the query execution data,
before transmitting the exportable result, remove a second portion of the remote portion specified by the second compliance rule.

16. A non-transitory computer readable medium comprising instructions, which when executed by at least one processor perform a method, the method comprising:
receiving, by a first query node, a local query request to read a first data of the data;
making a determination that the first data comprises a local portion and a remote portion;
in response to the determination:
executing the local query request by a query engine in a first geographic location, in which a first requestor that sent the local query request is located, to obtain a first query result, wherein the first query result comprises the local portion;
executing the local query request by a second query engine in a second geographic location, in which the first requestor that sent the local query request is not located, to obtain a second query result, wherein the second query result comprises the remote portion;
obtaining a first compliance rule based on at least one of the first geographic location, the second geographic location;
generating an exportable result by applying the first compliance rule to the second query result, wherein the exportable result does not include a portion of the remote portion, wherein the exportable result includes a count of a number of fields of the remote portion; and
transmitting both of the first query result and the exportable result to the first requestor.

17. The non-transitory computer readable medium of claim 16,
the method further comprising:
receiving, by the first query node, a remote query request to read a second data of the data;
making a second determination that the second data comprises a second local portion and a second remote portion;
in response to the second determination:
executing the remote query request by the query engine in the first geographic location, in which a second requestor that sent the remote query request is not located, to obtain a third query result, wherein the third query result comprises the second local portion;
obtaining a second compliance rule based on at least one of the first geographic location, the second geographic location;
generating a second exportable result by applying the second compliance rule to the third query result, wherein the second exportable result does not include a portion of the second local portion, wherein the second exportable result includes a second count of a number of fields of the second local portion;
executing the remote query request by the query engine in the second geographic location, in which the requestor that sent the remote query request is located, to obtain a fourth query result, wherein the fourth query result comprises the second remote portion;
transmitting both of the fourth query result and the second exportable result to the second requestor.

18. The non-transitory computer readable medium of claim 16,
wherein the query engine is executing on a first query node,
wherein the first requestor is one selected from a group consisting of a client and a second query node.

19. The non-transitory computer readable medium of claim 16, wherein the first requestor is an intermediate requestor.

20. The non-transitory computer readable medium of claim 19,
the method further comprising:
receiving, by the intermediate requestor, the exportable result; and
transmitting, by the intermediate requestor, the exportable result to a source requestor.

* * * * *